United States Patent [19]

Arena et al.

[11] Patent Number: 5,232,887
[45] Date of Patent: Aug. 3, 1993

[54] CATALYST FOR SWEETENING A SOUR HYDROCARBON FRACTION

[75] Inventors: Blaise J. Arena, Des Plaines; Jennifer S. Holmgren, Bloomingdale, both of Ill.

[73] Assignee: UOP, Des Plaines, Ill.

[21] Appl. No.: 862,151

[22] Filed: Apr. 2, 1992

[51] Int. Cl.$^5$ .................. B01J 31/18; B01J 31/20; B01J 31/22; B01J 31/28
[52] U.S. Cl. .................. 502/163; 502/161; 502/170; 502/164; 502/167; 502/439
[58] Field of Search ............ 502/161, 163, 213, 208, 502/200, 217, 218, 170, 204, 207, 202, 164, 167, 303, 304, 306, 307, 314, 315, 316, 318, 320, 328, 329, 331, 335, 336, 341, 342, 346, 161, 163, 170, 164, 167, 439

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim et al. | 208/206 |
| 2,988,500 | 6/1961 | Gleim et al. | 208/206 |
| 3,108,081 | 10/1963 | Gleim et al. | 252/428 |
| 3,252,892 | 5/1966 | Gleim | 208/206 |
| 3,980,582 | 9/1976 | Anderson et al. | 252/428 |
| 4,156,641 | 5/1979 | Frame | 208/207 |
| 4,234,455 | 11/1980 | Homeier et al. | 502/163 X |
| 4,290,913 | 9/1981 | Frame | 252/428 |
| 4,337,147 | 6/1982 | Frame | 208/206 |
| 4,490,246 | 12/1984 | Verachtert | 208/206 |
| 4,753,722 | 6/1988 | Le et al. | 208/207 |
| 4,913,802 | 4/1990 | Bricker et al. | 208/207 |

OTHER PUBLICATIONS

Catalysis Letters, 11, pp. 55-62 (1991).
J. Catalysis, 94, 547-557 (1985).

*Primary Examiner*—W. J. Shine
*Assistant Examiner*—Douglas J. McGinty
*Attorney, Agent, or Firm*—Thomas K. McBride; Eugene I. Snyder; Frank S. Molinaro

[57] ABSTRACT

A catalyst has been developed. The catalyst is a metal chelate dispersed on a basic support which is either a solid solution of metal oxides or a layered double hydroxide (LDH). The process involves contacting a sour hydrocarbon fraction which contains mercaptans with the catalyst in the presence of an oxidizing agent and a polar compound. Examples of these polar compounds are water and alcohols, with methanol being especially preferred. The process is unique in that the solid solution or LDH are solid bases which eliminates the need for a liquid base. Optionally, an onium compound may be used as a catalyst promoter.

10 Claims, No Drawings

CATALYST FOR SWEETENING A SOUR HYDROCARBON FRACTION

BACKGROUND OF THE INVENTION

Processes for the treatment of a sour hydrocarbon fraction where the fraction is treated by contacting it with an oxidation catalyst and an alkaline agent in the presence of an oxidizing agent at reaction conditions have become well known and widely practiced in the petroleum refining industry. These processes are typically designed to effect the oxidation of offensive mercaptans contained in a sour hydrocarbon fraction to innocuous disulfides-a process commonly referred to as sweetening. The oxidizing agent is most often air. Gasoline, including natural, straight run and cracked gasolines, is the most frequently treated sour hydrocarbon fraction. Other sour hydrocarbon fractions which can be treated include the normally gaseous petroleum fractions as well as naphtha, kerosene, jet fuel, fuel oil, and the like.

A commonly used continuous process for treating sour hydrocarbon fractions entails contacting the fraction with a metal phthalocyanine catalyst dispersed in an aqueous caustic solution to yield a doctor sweet product. Doctor sweet means a mercaptan content in the product low enough to test "sweet" (as opposed to "sour") by the well known doctor test. The sour fraction and the catalyst containing aqueous caustic solution provide a liquid-liquid system wherein mercaptans are converted to disulfides at the interface of the immiscible solutions in the presence of an oxidizing agent—usually air. Sour hydrocarbon fractions containing more difficult to oxidize mercaptans are more effectively treated in contact with a metal chelate catalyst dispersed on a high surface area adsorptive support—usually a metal phthalocyanine on an activated charcoal. The fraction is treated by contacting it with the supported metal chelate catalyst at oxidation conditions in the presence of a soluble alkaline agent. One such process is described in U.S. Pat. No. 2,988,500. The oxidizing agent is most often air admixed with the fraction to be treated, and the alkaline agent is most often an aqueous caustic solution charged continuously to the process or intermittently as required to maintain the catalyst in the caustic-wetted state.

The prior art shows that alkaline agents are necessary in order to catalytically oxidize mercaptans to disulfides. Thus, U.S. Pat. Nos. 3,108,081 and 4,156,641 disclose the use of alkali hydroxides especially sodium hydroxide for oxidizing mercaptans. Further, U.S. Pat. No. 4,913,802 discloses the use of ammonium hydroxide as the basic agent. The activity of the metal chelate systems can be improved by the use of quaternary ammonium compound as disclosed in U.S. Pat. Nos. 4,290,913 and 4,337,147.

Applicants have developed a catalyst and a process using the catalyst which is completely different from all the sweetening processes previously disclosed in the art. Applicants' process involves the use of a solid base instead of a liquid base. The solid bases which can be used to carry out the instant process are either a solid solution of metal oxides or layered double hydroxides (LDH). One example of a solid solution of metal oxides is magnesium oxide and aluminum oxide with varying Mg/Al ratios. An example of a layered double hydroxide is hydrotalcite which is a clay having the formula $Mg_6Al_2(OH)_{16}(CO_3) \cdot 4H_2O$. Applicants have also found that these solid bases can serve as the support for the desired metal chelate. In order to obtain appreciable conversion of mercaptans to disulfides applicants have further determined that an effective amount of a polar compound capable of serving as a proton-transfer medium must be added to the process. Examples of these compounds are water and methanol.

To applicants' knowledge there is only one report in the literature of a hydrotalcite material being used to oxidize mercaptans. *Catalysis Letters*, 11, pp. 55–62 (1991). This article describes the oxidation of 1-decanethiol in water. However, the catalyst and process described in this article are considerably different from applicants' process and catalyst. The reference discloses an LDH in which cobalt phthalocyanine is intercalated between the LDH layers, whereas applicants' composition is a metal chelate, e.g., cobalt phthalocyanine dispersed on an LDH support. The reference uses a borate buffer to maintain the pH at 9.25 whereas applicants do not use any added base. Thus, the system disclosed in the reference and applicants' system are clearly different.

Finally, it should be pointed out that the prior art discloses that metal chelates can be dispersed on adsorbent supports such as clays or oxides (see e.g., U.S. Pat. No. 4,290,913). However, there is no indication that solid solutions or LDHs could be used as support nor that such catalysts would be able to function without an added liquid base.

SUMMARY OF THE INVENTION

As stated, this invention relates to a process for treating a sour hydrocarbon fraction containing mercaptans and to a catalyst for use in said process. One embodiment of the invention is a catalyst for oxidizing mercaptans to disulfides comprising a metal chelate dispersed on a support selected from the group consisting of a solid solution of metal oxides, a layered double hydroxide and mixtures thereof, the solid solution having the formula $xMO \cdot yM'_2O_3$ where M is at least one metal having a +2 oxidation state and is selected from the group consisting of magnesium, nickel, zinc, copper, iron, cobalt, calcium and mixtures thereof and M' is at least one metal having a +3 oxidation state and is selected from the group consisting of aluminum, chromium, gallium, scandium, iron, lanthanum, cerium, yttrium, boron and mixtures thereof and the ratio of x:y is greater than 1 to about 15, the layered double hydroxide represented by the formula

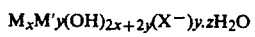

$$M_xM'_y(OH)_{2x+2y}(X^-)_y \cdot zH_2O$$

where $X^-$ is an anion selected from the group consisting of carbonate, nitrate, halide and mixtures thereof, the ratio of x:y is greater than 1 to about 15, and z varies from about 1 to about 50.

Another embodiment of the invention is a process for sweetening a sour hydrocarbon fraction which involves contacting the sour hydrocarbon fraction with the catalyst described in the previous paragraph in the presence of an oxidizing agent and an effective amount of a polar compound.

A specific embodiment of the invention is a catalyst containing cobalt phthalocyanine on a magnesium oxide/aluminum oxide (Mg/Al ratio of 2:1) support. This catalyst is used in conjunction with air and methanol to sweeten a sour hydrocarbon fraction.

Other objects and embodiments of this invention will become apparent in the following detailed description.

DETAILED DESCRIPTION OF THE INVENTION

As stated, this invention relates to a process for treating a sour hydrocarbon fraction that contains mercaptans and to a catalyst for use in said process. The process involves contacting the hydrocarbon fraction with a catalyst, which is a metal chelate dispersed on a solid base, in the presence of an oxidizing agent and an effective amount of a polar compound.

Thus, one necessary component of the instant invention is a metal chelate. The metal chelate employed in the practice of this invention can be any of the various metal chelates known to the art as effective in catalyzing the oxidation of mercaptans contained in a sour petroleum distillate to disulfides. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, niobium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

Another necessary component of this invention is a solid base which also acts as the support for the metal chelate. The solid base can be a solid solution of metal oxides, a layered double hydroxide or a mixture thereof. The solid solution has the formula $xMO \cdot yM'_2O_3$ where M is a metal with a +2 oxidation state and M' is a metal with a +3 oxidation state. The M metals are selected from the group consisting of magnesium, nickel, zinc, copper, iron, cobalt and mixtures thereof, while M' is selected from the group consisting of aluminum, chromium, gallium and mixtures thereof. Finally, x and y are chosen such that the ratio of x:y is greater than one to about 15. These solid solution materials are prepared by heating the corresponding layered double hydroxide (LDH) materials at a temperature of about 300° to about 750° C. When preparing the solid solution from the LDH precursor, the precursor must have as its counter ion (anion) one which decomposes upon heating, e.g., nitrate or carbonate. Counter ions such as chloride or bromide would be left on the solid solution support and may be detrimental to catalyst activity.

Layered double hydroxides (LDH) are basic materials that have the formula

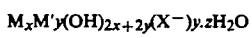

$$M_xM'_y(OH)_{2x+2y}(X^-)_y \cdot zH_2O$$

The M and M' metals are the same as those described for the solid solution. The values of x and y are also as set forth above. $X^-$ is an anion selected from the group consisting of carbonate, nitrate, halides and mixtures thereof with carbonate and nitrate preferred. Finally, z varies from about 1 to about 50 and preferably from about 1 to about 15. These materials are referred to as layered double hydroxides because they are composed of octahedral layers, i.e. the metal cations are octahedrally surrounded by hydroxyl groups. These octahedra share edges to form infinite sheets. Interstitial anions such as carbonate are present to balance the positive charge in the octahedral layers. The preparation of layered double hydroxides is well known in the art and can be exemplified by the preparation of a magnesium/aluminum layered double hydroxide which is known as hydrotalcite. Hydrotalcite can be prepared by coprecipitation of magnesium and aluminum carbonates at a high pH. Thus magnesium nitrate and aluminum nitrate (in the desired ratios) are added to an aqueous solution containing sodium hydroxide and sodium carbonate. The resultant slurry is heated at about 65° C. to crystallize the hydrotalcite and then the powder is isolated and dried. Extensive details for the presentation of various LDH materials may be found in *J. Catalysis*, 94, 547–557 (1985) which is incorporated by reference.

Although both the LDH and the basic solid solutions can be used as the solid base and support, it is preferred to use the solid solutions. One reason is that the solid solutions have a much higher surface area than the LDH materials, usually on the order of about 150 to about 350 m²/g versus less than 100 m²/g for the LDH materials. Owing to this increased surface area, the basic sites are more accessible in the solid solution than in the LDH. Additionally, the LDH has some counterion such as carbonate and therefore has few true basic sites. That is, the ability of the LDH to exchange anions is owing to the presence of the anions and not the presence of true basic sites.

The metal chelate component can be dispersed on the solid base support in any conventional or otherwise convenient manner. The metal chelate can be dispersed on the support from an aqueous or alcoholic solution and/or dispersion thereof. The dispersion process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic, e.g. methanol, solution and/or dispersion to disperse a given quantity of the metal chelate. It is preferred to use an alcoholic solution. In general, the amount of metal chelate which can be adsorbed on the solid base support and still form a stable catalyst is up to about 25 weight percent of the composite. A lesser amount in the range of from about 0.1 to about 10 weight percent of the composite generally forms a suitably active catalyst.

One method of preparation involves the use of a steam-jacketed rotary dryer. The solid base support is immersed in the impregnating solution and/or dispersion containing the desired metal chelate contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

It is important to point out that the metal chelate is impregnated onto the LDH and not intercalated. Impregnation results in a more active catalyst since intercalation stuffs the layer with the metal chelate thereby making it difficult for mercaptan molecules to get to the metal center.

In order to improve the activity and stability of the catalyst, an onium compound can be added to the hydrocarbon feed or can be dispersed on the hydrotalcite along with the metal chelate. Onium compounds are ionic compounds in which the positively charged (cationic) atom is a nonmetallic element, other than carbon, not bonded to hydrogen. The onium compounds which can be used in this invention are selected from the group consisting of phosphonium, ammoniun, arsonium, stibonium, oxonium and sulfonium compounds, i.e., the cationic atom is phosphorus, nitrogen, arsenic, antimony, oxygen and sulfur, respectively. Table 1 presents the general formula of these onium compounds, and the cationic element.

TABLE 1

| Name and Formula of Onium Compounds | | |
|---|---|---|
| Formula* | Name | Cationic Element |
| $R_4N^+$ | quaternary ammonium | nitrogen |
| $R_4P^+$ | phosphonium | phosphorous |
| $R_4As^+$ | arsonium | arsenic |
| $R_4Sb^+$ | stibonium | antimony |
| $R_3O^+$ | oxonium | oxygen |
| $R_3S^+$ | sulfonium | sulfur |

*R is a hydrocarbon radical

For the practice of this invention it is desirable that the onium compounds have the general formula $[R'(R)_wM]^+X^-$. In said formula, R is a hydrocarbon group containing up to about 20 carbon atoms and selected from the group consisting of alkyl, cycloalkyl, aryl, alkaryl and aralkyl. It is preferred that one R group be an alkyl group containing from about 10 to about 18 carbon atoms. The other R group(s) is (are) preferably methyl, ethyl, propyl, butyl, benzyl, phenyl and naphthyl groups. R' is a straight chain alkyl group containing from about 5 to about 20 carbon atoms and preferably an alkyl radical containing about 10 to about 18 carbon atoms, X is hydroxide, sulfate, nitrate, nitrite, phosphate, acetate, citrate and tartrate, and w is 2 when M is oxygen or sulfur and w is 3 when M is phosphorus, nitrogen, arsenic or antimony. The preferred cationic elements are phosphorus, nitrogen, sulfur and oxygen.

Illustrative examples of onium compounds which can be used to practice this invention, but which are not intended to limit the scope of this invention are: benzyldiethyldodecylphosphonium hydroxide, phenyldimethyldecylphosphonium hydroxide, benzyldibutyldecylphosphonium hydroxide, benzyldimethylhexadecylphosphonium hydroxide, trimethyldodecylphosphonium hydroxide, naphthyldimethylhexadecylphosphonium hydroxide, tributylhexadecylphosphonium hydroxide, benzylmethylhexadecyloxonium hydroxide, benzylethyldodecyloxonium hydroxide, naphthylpropyldecyloxonium hydroxide, dibutyldodecyloxonium hydroxide, phenylmethyldodecyloxonium hydroxide, dipropylhexadecyloxonium hydroxide, dibutylhexadecyloxonium hydroxide, benzylmethylhexadecylsulfonium hydroxide, diethyldodecylsulfonium hydroxide, naphthylpropylhexadecylsulfonium hydroxide, phenylmethylhexadecylsulfonium hydroxide, dimethylhexadecylsulfonium hydroxide, benzylbutyldodecylsulfonium hydroxide, benzyldiethyldodecylarsonium hydroxide, benzyldiethyldodecylstibonium hydroxide, trimethyldodecylarsonium hydroxide, trimethyldodecylstibonium hydroxide, benzyldibutyldecylarsonium hydroxide, benzyldibutyldecylstibonium hydroxide, tributylhexadecylarsonium hydroxide, tributylhexadecylstibonium hydroxide, naphthylpropyldecylarsonium hydroxide, naphthylpropyldecylstibonium hydroxide, benzylmethylhexadecylarsonium hydroxide, benzylmethylhexadecylstibonium hydroxide, benzylbutyldodecylarsonium hydroxide, benzylbutyldodecylstibonium hydroxide, benzyldimethyldodecylammonium hydroxide, benzyldimethyltetradecylammonium hydroxide, benzyldimethylhexadecylammonium hydroxide, benzyldimethyloctadecylammonium hydroxide, dimethylcyclohexyloctylammonium hydroxide, diethylcyclohexyloctylammonium hydroxide, dipropylcyclohexyloctylammonium hydroxide, dimethylcyclohexyldecylammonium hydroxide, diethylcyclohexyldecylammonium hydroxide, dipropylcyclohexyldecylammonium hydroxide, dimethylcyclohexyldodecylammonium hydroxide, diethylcyclohexyldodecylammonium hydroxide, dipropylcyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, as well as the corresponding sulfate, nitrate, nitrite, phosphate, acetate, citrate and tartrate. Other suitable quaternary ammonium hydroxides are described in U.S. Pat. No. 4,156,641, which is incorporated by reference.

When the optional onium compound is added as a liquid to the hydrocarbon fraction, it is desirable that it be present in a concentration from about 0.05 to about 500 wppm and preferably from about 0.5 wppm to about 100 wppm based on hydrocarbon. If it is desired to disperse the onium compound onto the hydrotalcite support, this may be done as described for the metal chelate. The onium compound may be impregnated either from a separate solution before or after the impregnation of the metal chelate or it may be impregnated from a common solution. When the onium compound is dispersed onto the hydrotalcite support, it is desirable that it be present in a concentration from about 0.1 to about 10 weight percent of the catalyst. Of course as is well known in the art, the onium compound may be initially dispersed onto the hydrotalcite and then desired amounts within the stated range above added intermittently to the hydrocarbon fraction.

An alternative and convenient method for dispersing the metal chelate and optional onium compound on the basic support comprises predisposing the support in a sour hydrocarbon fraction treating zone or chamber as a fixed bed and passing a metal chelate and optional onium compound solution and/or dispersion through the bed in order to form the catalytic composite in situ. This method allows the solution and/or dispersion to be recycled one or more times to achieve a desired concentration of the metal chelate and optional onium compound on the adsorbent support. In still another alternative method, the basic support may be predisposed in said treating zone or chamber, and the zone or chamber thereafter filled with the solution and/or dispersion to soak the support for a predetermined period.

Another necessary component of the process of this invention is a polar compound. It is believed that the function of this polar compound is to serve as a proton transfer medium. Specifically the compound is selected from the group consisting of water, alcohols, esters, ketones, diols and mixtures thereof. Specific examples include methanol, ethanol, propanol, isopropanol, t-butanol, n-butanol, benzyl alcohol and s-butanol. Examples of diols which can be used include ethylene glycol, 1,3-propylene glycol, 1,2-propylene glycol, 1,4-butylene glycol, 1,3-butylene glycol and 2,3-butylene glycol. Examples of ketones and esters are acetone, methyl formate and ethyl acetate. Of these compounds preferred compounds are water and alcohols, with methanol being an especially preferred alcohol.

As previously stated, sweetening of the sour hydrocarbon fraction is effected by oxidizing the mercaptans to disulfides. Accordingly, the process requires an oxidizing agent, preferably air, although oxygen or other oxygen-containing gases may be employed. The sour hydrocarbon fraction may contain sufficient entrained air, but generally added air is admixed with the fraction and charged to the treating zone concurrently therewith. In some cases, it may be advantageous to charge the air separately to the treating zone and countercurrent to the fraction separately charged thereto.

The treating conditions and specific methods used to carry out the present invention are those that have been disclosed in the prior art. Typically, the sour hydrocarbon fraction is contacted with the catalyst which is in the form of a fixed bed. The contacting is thus carried out in a continuous manner and the hydrocarbon fraction may be flowed upwardly or downwardly through the catalytic composite. The process is usually effected at ambient temperature conditions, although higher temperatures up to about 105° C. are suitably employed. Pressures of up to about 1,000 psi or more are operable although atmospheric or substantially atmospheric pressures are suitable. Contact times equivalent to a liquid hourly space velocity of from about 0.5 to about 10 or more are effective to achieve a desired reduction in the mercaptan content of a sour hydrocarbon fraction, an optimum contact time being dependent on the size of the treating zone, the quantity of catalyst contained therein, and the character of the fraction being treated. Examples of specific arrangements to carry out the treating process may be found in U.S. Pat. Nos. 4,490,246 and 4,753,722 which are incorporated by reference.

The following examples are presented in illustration of this invention and are not intended as undue limitations on the generally broad scope of the invention as set out in the appended claims.

EXAMPLE 1

Preparation of $MgO.Al_2O_3$ Solid Solution

A 2L, 3-necked round bottomed flask was equipped with a reflux condenser, a thermometer, a mechanical stirrer, and a Glass Col TM heating mantle. To this 3-neck flask there was added a solution containing 610 g of water, 60 g of $Na_2CO_3.H_2O$ and 71 g of NaOH and the flask was cooled to less than 5° C. An addition funnel was put in place of the reflux condenser and charged with a solution of 345 g water, 130 g $Mg(NO_3)_2.6H_2O$ and 75 g $Al(NO_3)_3.9H_2O$. This solution was added over a period of 4 hours while maintaining the reaction mixture temperature at less than 5° C. The resultant slurry was stirred for 1 hour at less than 5° C. The addition funnel was removed and the reflux condenser replaced in order to heat the slurry to 60° C.±5° C. for 1 hour. The slurry was then cooled to room temperature and the solids recovered by filtration, washed with 10L of hot DI water and then dried at 100° C. for 16 hours. After crushing, the solid material was slurried and extruded. This product was characterized as an LDH by its x-ray diffraction (XRD) pattern. The extruded product was calcine at 450° C. for 12 hours in a muffle furnace with an air flow. This product was characterized as a $MgO.Al_2O_3$ solid solution by XRD. The BET surface area for this material was 240 $m^2/g$.

EXAMPLE 2

Preparation of Cobalt Phthalocyanine on $MgO.Al_2O_3$ Catalyst

To 50 mL of methanol there were added 0.60 g of cobalt phthalocyanine tetrasulfonate, prepared as described in U.S. Pat. No. 4,003,827, to give a deep blue homogeneous solution. To this solution there were added 16 g of the $MgO/Al_2O_3$ solid solution extrudate prepared in Example 1. The resultant mixture was agitated gently for about 16 hours and filtered. The solid material which was now a deep blue was washed three times with 30 mL of fresh methanol and then dried at 110° C. for one hour. Analysis of this material indicated that it contained 750 ppm of cobalt. This sample was identified as catalyst A and had an x-ray diffraction pattern characteristic of cobalt phthalocyanine on a $MgO.Al_2O_3$. solid solution.

EXAMPLE 3

A reactor bed was filled with 17 cc of catalyst A. A sour kerosine feedstock boiling in the 48°–228° C. and containing about 162 ppm mercaptan sulfur was processed downflow through the reactor bed at a liquid hourly space velocity of 1,2, an inlet temperature of 38° C. and a pressure of 100 psig. The feedstock was charged under sufficient air pressure to provide about 1.3 times the stoichiometric amount of oxygen required to oxidize the mercaptans.

For the first 110 hours on streams no water was added to the kerosine feed. Although the catalyst had good initial activity (product had only 10 ppm mercaptan), at about 110 hours the product had 90 ppm mercaptan. At this point 7,000 ppm of water was added to the feed and the mercaptan level monitored. The results of this test are presented in Table 2.

TABLE 2

Mercaptan Conversion Using a Cobalt Phthalocyanine on MgO/Al$_2$O$_3$ Catalyst and Water

| Time on Stream (Hrs) | Product Mercaptan Sulfur (WPPM) |
|---|---|
| 112 | 89 |
| 120 | 53 |
| 136 | 12 |
| 152 | 11 |
| 168 | 11 |
| 200 | 16 |
| 224 | 22 |
| 248 | 30 |

As the data show, the catalyst of this invention (catalyst A) is able to sweeten a sour kerosine feed for a considerable amount of time on stream with deterioration being observed only at the tail end of the run.

EXAMPLE 4

The process described in Example 3 was repeated using a fresh batch of catalyst A and using methanol instead of water. The results of this experiment are presented in Table 3.

TABLE 3

Mercaptan Conversion Using a Cobalt Phthalocyanine on MgO/Al$_2$O$_3$ Catalyst and Methanol

| Time on Stream (Hrs) | Methanol Conc. (ppm) | Product Mercaptan Sulfur (WPPM) |
|---|---|---|
| 8 | 8,400 | 60 |
| 24 | 8,400 | 31 |
| 40 | 8,400 | 20 |
| 56 | 4,200 | 18 |
| 80 | 4,200 | 18 |
| 104 | 4,200 | 16 |
| 128 | 4,200 | 16 |
| 152 | 4,200 | 15 |
| 160 | 2,100 | 11 |
| 184 | 2,100 | 14 |

Again, the data clearly show the ability of a catalyst of this invention to sweeten a sour hydrocarbon fraction when methanol is used as the polar compound.

We claim as our invention:

1. A catalyst for oxidizing mercaptans to disulfides comprising a metal chelate dispersed on a support selected from the group consisting of a solid solution of metal oxides, a layered double hydroxide and mixtures thereof, the solid solution having the formula xMO.yM'$_2$O$_3$ where M is at least one metal having a +2 oxidation state and is selected from the group consisting of magnesium, nickel, zinc, copper, iron, cobalt, calcium and mixtures thereof and M' is at least one metal having a +3 oxidation state and is selected from the group consisting of aluminum, chromium, gallium, scandium, iron, lanthanum, cerium, yttrium, boron and mixtures thereof and the ratio of x:y is greater than 1 to about 15, the layered double hydroxide represented by the formula $$M_xM'_y(OH)_{2x+2y}(X^-)_y \cdot zH_2O$$

where $X^-$ is an anion selected from the group consisting of carbonate, nitrate, halide and mixtures thereof, the ratio of x:y is greater than 1 to about 15, and z varies from about 1 to about 50.

2. The catalyst of claim 1 where the support is a solid solution of basic metal oxides.

3. The catalyst of claim 2 where the solid solution is a magnesium oxide and aluminum oxide solid solution.

4. The catalyst of claim 1 where the support is a layered double hydroxide.

5. The catalyst of claim 1 where the metal chelate is a metal phthalocyanine.

6. The catalyst of claim 5 where the metal phthalocyanine is cobalt phthalocyanine.

7. The catalyst of claim 1 where the metal chelate is present in a concentration from about 0.1 to about 10 weight percent of the catalyst.

8. The catalyst of claim 1 characterized in that the support has additionally dispersed thereon an onium compound having the formula $[R'(R)_wM]^+X^-$ where R is a hydrocarbon group containing up to about 20 carbon atoms and selected from the group consisting of alkyl, cycloalkyl, aryl, alkaryl and aralkyl, R' is a straight chain alkyl group containing from about 5 to about 20 carbon atoms, M is phosphorous (phosphonium compound), nitrogen (ammonium compound), arsenic (arsonium compound), antimony (stibonium compound), oxygen (oxonium compound) or sulfur (sulfonium compound), X is hydroxide, sulfate, nitrate, nitrite, phosphate, acetate, citrate and tartrate, w is 2 when M is oxygen or sulfur and w is 3 when M is phosphorous, nitrogen, arsenic or antimony.

9. The catalyst of claim 8 where the onium compound is a quaternary ammonium compound.

10. The catalyst of claim 8 where the onium compound is present in a concentration of about 0.1 to about 10 weight percent of the catalyst.

* * * * *